Figure 1:
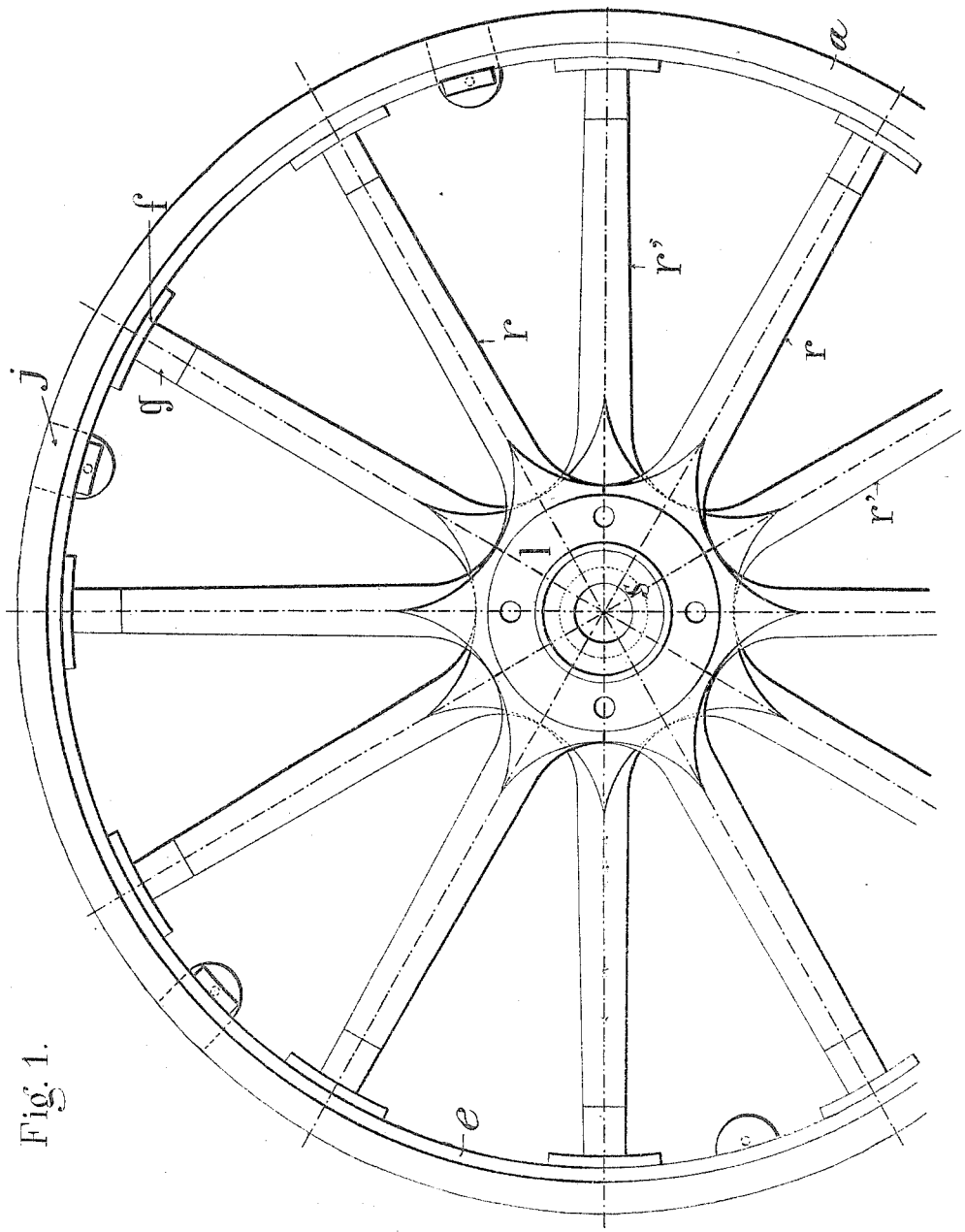

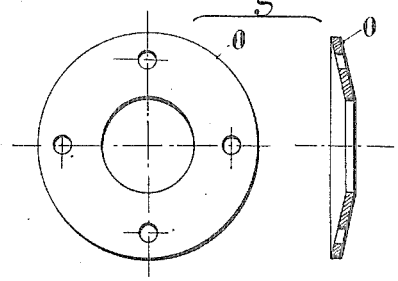
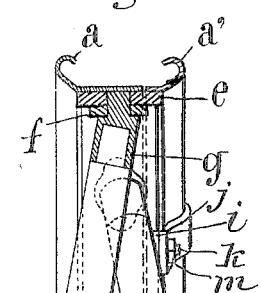
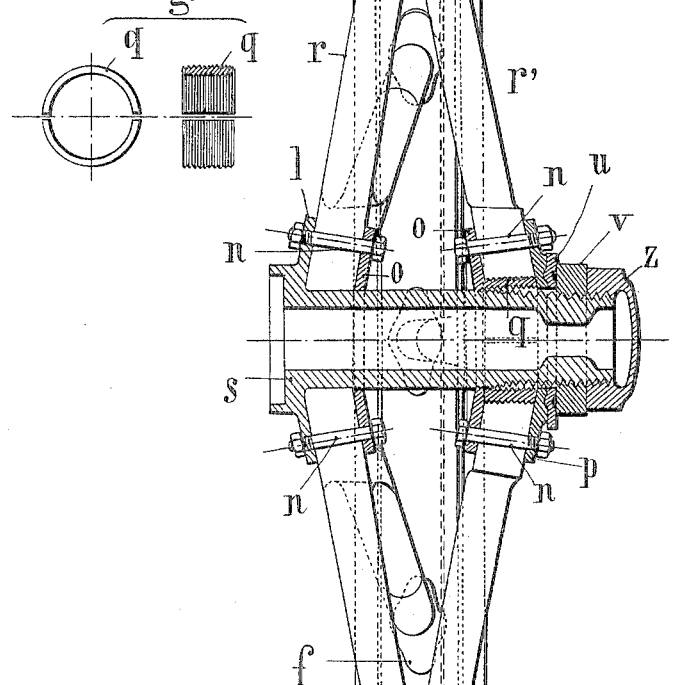
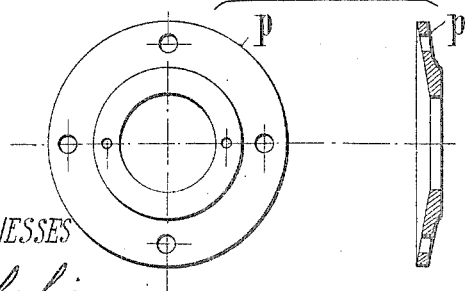

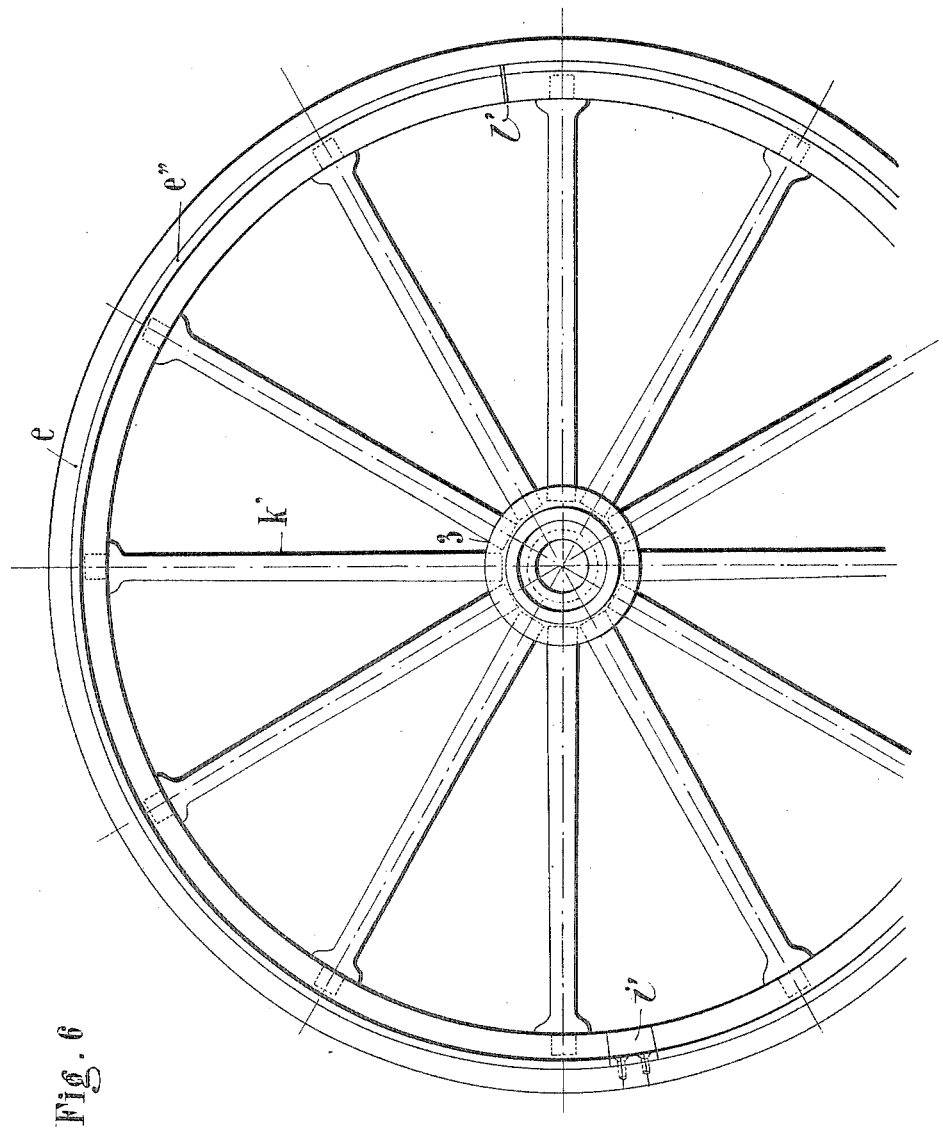

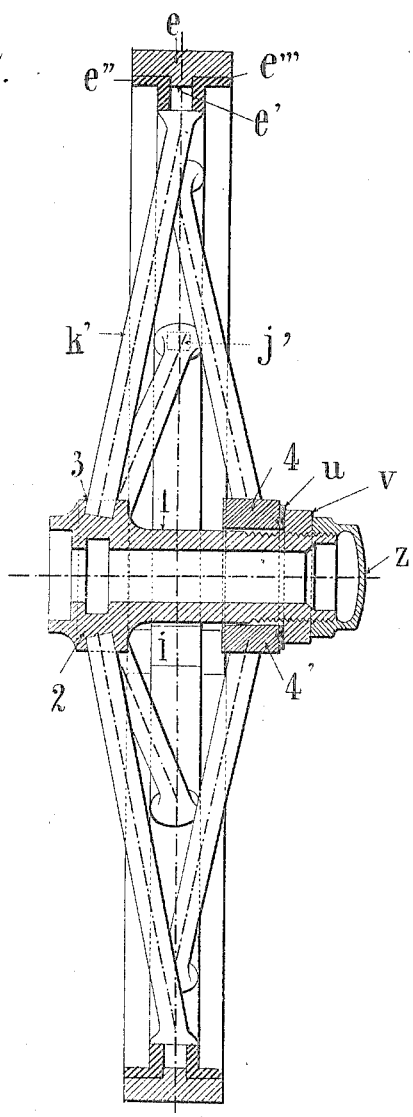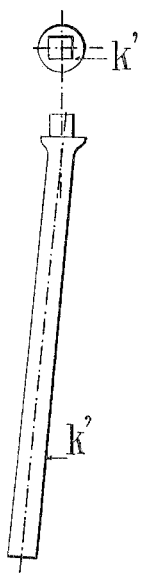

UNITED STATES PATENT OFFICE.

JOSEPH MARIE BOULANGER, OF REVIGNY, FRANCE.

WHEEL FOR VEHICLES.

No. 804,577.　　　　Specification of Letters Patent.　　　　Patented Nov. 14, 1905.

Application filed July 8, 1904. Serial No. 215,732.

*To all whom it may concern:*

Be it known that I, JOSEPH MARIE BOU-LANGER, a citizen of the Republic of France, and a resident of Revigny, Meuse, France, have invented certain new and useful Improvements in and Relating to Wheels for Vehicles, Agricultural Implements, and the Like, of which the following is a specification.

This invention relates to certain improvements in wheels for trucks, agricultural implements, and vehicles of all kinds, and has for its object the provision of a dismountable wheel, all the parts of which are capable of being readily assembled and taken apart.

A further object of the invention is the provision of a wheel wherein means are provided for properly adjusting the tension of the spokes and in which means are provided for permitting the ready removal of the tire when it is desired; and with these ends in view the invention consists in the novel features and combinations of parts to be hereinafter described and claimed.

In order that the invention may be readily and clearly understood, the invention is illustrated by way of example in the accompanying drawings, in which—

Figure 1 is an elevation of a wheel for motor-vehicles constructed according to the present invention. Fig. 2 is a vertical cross-section of the same. Figs. 3, 4, and 5 are details of the wheel illustrated in Figs. 1 and 2. Fig. 6 is an elevation of a wheel of slightly-modified construction. Fig. 7 is a vertical cross-section of the same, and Fig. 8 is a detail view of one of the spokes employed.

Similar characters of reference indicate corresponding parts throughout the several views.

As shown in Figs. 1 and 2, the dismountable wheel for motor-vehicles consists, essentially, of a felly in two parts $a$ and $a'$, the part $a$ of the felly being riveted to a flat bar $e$, while the part $a'$ of the felly is dismountable, as will be described. Upon the rim constituted by the iron bar $e$ plates $f$ are riveted at intervals and in suitable positions for the reception of the spokes, said plates serving to carry the sockets $g$, into which the spokes are fitted. This felly $e$ is also provided at intervals with angle-pieces $i$, having perforations therein which are engaged by bolts $k$, that secure suitable clamps $j$, made rigid with the dismountable rim $a'$, said clamps being secured to said bolts $k$ by means of nuts $m$. In this way the rim $a'$ is readily dismountable by removing the nuts $m$. The felly shown is adapted for use with pneumatic tires with wired edges, upon which felly the tire is first of all mounted at the riveted part $a$, the other part of the tire being then secured by means of the rim $a'$ and fixed by the parts $i$ and $j$ and the bolts $k$. The hub $s$ may be of any suitable type and is provided at $l$ with a fixed cheek. A first oblique cheek $o$ is fitted on the hub with slight friction, this cheek $o$ serving to maintain the wooden spokes $r$ of the left-hand portion of the wheel, Fig. 2, against the fixed cheek $l$ by means of bolts $n$, which pass through the two cheeks. Upon the hub for the purpose of engaging the spokes $r'$ of the right-hand portion of the wheel on their inner face is passed a second cheek $o$. The wooden spokes $r'$ when held at their extremities and resting upon the second cheek $o$ are pressed and maintained by a cheek $p$, provided with a boss upon which the assembling nut $v$ presses. The cheeks at both sides of the wheels are held in position by means of bolts $n$, of any desired number. A washer $u$, having small lugs or projections which are caused to engage before screwing down the nut with cavities which are punched in the cheek $p$, is interposed between the nut $v$ and the said cheek and prevents the accidental loosening of the nut, the washer being turned over one of the faces of the latter.

Fig. 3 of the drawings shows in elevation and in section one of the oblique washers $o$ provided with holes for the passage of the bolts $n$.

Fig. 4 shows the cheek $p$, provided with holes for the passage of the bolts and with a boss on one surface.

Fig. 5 is a detail view of a sheath or sleeve in two parts, threaded internally and externally, which is arranged at $q$, Fig. 2, in such a manner as to inclose the hub. Upon the outer threads of this sheath or sleeve are applied the extremities of the spokes of the right-hand portion of the sheath. This sheath $q$ serves to prevent slipping of the movable spokes upon the hub, and thereby relieves the nut $v$. The rotation of the nut $v$ causes the securing of the spokes $r \ r'$ of the wheel. A cap-nut $z$ completes the assemblage.

In the arrangement which has been described the felly is adapted for the reception of a pneumatic tire; but it may be of any other suitable form, such, for example, as that shown in Figs. 6, 7, and 8. It may be constituted by merely a flat iron bar for application to the wheels of ordinary vehicles, such as carriages, carts, and the like. In this case the felly is constituted by a metal hoop $e$, provided with rib $e'$ on its inner face, permitting the relative displacement of two inner rims $e''$ and $e'''$, which may be fixed to the outer rim $e$ by means of the rib $e'$. These inner rims $e''$ $e'''$ reinforce the outer rim $e$ and serve for fixing the spokes. Rectangular holes $j''$ are formed in the rims $e''$ $e'''$ and serve to prevent the movable spokes $k$ from rotating. Any desired number of metal spokes $k'$ may be provided, and they may be of any desired form. At $l'$ is represented the joint of the two rims $e''$ and $e'''$. Diametrically opposite is arranged a joint-cover $i''$, which when placed in position fills the joint $l'$. This joint-cover $i''$ is removed when it is desired to dismount the rims $e''$ and $e'''$. The hub of this wheel may be of any convenient type—for example, that shown in Figs. 6 and 7, in which it is provided with a projection 2, rigid with the hub 1, said projection being provided with holes 3, variable in number, for the reception of the extremities of the removable spokes. It is on the side 2 of the hub 1 that the mounting of the spokes is commenced by inserting each of them by their extremities into the square holes $j''$ of the rim and the holes 3 of the hub. The spokes of this face of the wheel being mounted, a crown in two parts 4 4' is applied upon the hub, this crown being recessed in such a manner as to perfectly inclose the hub 1 and act upon it by the tension of the spokes $k'$ upon the rim. The parts 4 4' of the crown are provided, like the projection, with holes 3 for the introduction of the extremities of the spokes $k'$ of the second face of the wheel. The method of mounting the spokes of this face of the wheel will be readily understood. This mounting is facilitated by the possibility of moving the crown 4 4' along the hub. The securing of the spokes is effected by a nut $v$, which, being screwed upon the hub, bears as before against a washer $u$, provided with lugs or teeth which are caused in mounting to engage the small cavities which are punched in the crown 4 4'. The variable compression produced by the nut $v$ is therefore transmitted to the said crown. A cap $z$ completes the assemblage.

In mounting the spokes of the wheels shown in Figs. 1 and 2 the procedure is as follows: The counter-nut $z$ and nut $v$, the plate $u$, the sleeve $q$, and the cheeks $o$ being removed, the spokes $r$ of the left-hand side are arranged suitably by inserting them in the rim and in contact with the fixed cheek 1, after which the first cheek $o$ is placed upon the opposite side of the same. The cheeks 1 and $o$ are then bolted together by means of the bolts $n$. This having been done, the second cheek $o$ is passed upon the hub, the sleeve $q$ is mounted, and the right-hand spokes $r'$ are placed in position, their extremities bearing upon the said sleeve. The cheek $p$ and the plate $u$ are then arranged in position and the spokes $r'$ secured between said last-named cheek and the cheek $o$ by the bolts $n$, after which, by means of the nut $v$, the whole is tightened up until the spokes $r$ and $r'$ present the desired degree of compression. The counter-nut $z$ is then mounted.

With each of the types of wheel which have been described a protecting-case (not shown) may be combined, the purpose of this casing, which is suitably arranged between the spokes, being to prevent mud from collecting inside the wheel and deteriorating the same.

Having thus described my invention, I claim as new and desire to secure by Letters Patent—

1. In a wheel, a hub provided at one end portion with a fixed spoke-retaining means and at the opposite end with exterior screw-threads, a spoke-retaining member movable along said hub and provided on its outer face with indentations or recesses, an outer nut engaging said screw-threads and operable to adjust said spoke-retaining member along the hub, and a washer interposed between said nut and said spoke-retaining member, said washer being provided with means for engaging the indentations or recesses of the latter.

2. In a wheel, a hub provided at one end with exterior screw-threads, a split sleeve or sheath surrounding and movable along the threaded portion of said hub, spoke-retaining cheeks abutting against either end of said sheath, and a nut engaging the screw-threads of the hub and operable to adjust said cheeks and said sheath longitudinally thereof.

3. In a wheel, a hub provided at one end portion with a fixed spoke-retaining means and at the opposite end portion with exterior screw-threads, a split sleeve or sheath surrounding and movable along the threaded portion of said hub, spoke-retaining cheeks abutting against either end of said sheath, means for retaining a number of spokes between said cheeks, and a nut engaging said screw-threads and operable to adjust said cheeks and said sleeve or sheath longitudinally of the hub.

4. In a wheel, a hub provided at one end with exterior screw-threads, a split interiorly-threaded sleeve or sheath surrounding and movable along the threaded portion of said hub, inner and outer spoke-retaining cheeks abutting against either end of said sheath, a washer bearing against said outer cheek, and a nut bearing against said washer and adjustable along the threaded portion of said hub.

In testimony whereof I have signed this specification in the presence of two subscribing witnesses.

JOSEPH MARIE BOULANGER.

Witnesses:
    EMILE LEDRET,
    HANSON C. COXE.